United States Patent

Dykstra

[15] 3,706,620
[45] Dec. 19, 1972

[54] METHOD AND APPARATUS FOR FORMING THE END OF A PLASTIC TUBE AND SEALING THE TUBE WITHIN A FLEXIBLE CONTAINER

[72] Inventor: Edward G. Dykstra, East Aurora, N.Y.

[73] Assignee: Ethylox Products, Inc.,, Buffalo, N.Y.

[22] Filed: March 13, 1970

[21] Appl. No.: 19,224

[52] U.S. Cl. .................156/221, 156/242, 156/273, 156/293, 222/572
[51] Int. Cl. .............................................B29c 27/04
[58] Field of Search...156/273, 293, 303.1, 242, 219, 156/221, 222, 294, 306, 290; 222/566, 572; 219/10.53; 229/62.5; 150/1.7

[56] References Cited

UNITED STATES PATENTS

| | | |
|---|---|---|
| 3,558,397 | 1/1971 | Clark................................156/290 X |
| 3,537,137 | 11/1970 | Lancesseur........................18/19 TF |
| 3,322,590 | 5/1967 | Clark................................156/294 X |
| 3,051,605 | 8/1962 | Stannard..........................156/293 X |
| 2,309,561 | 1/1943 | Westin et al......................18/19 TE |

Primary Examiner—Carl D. Quarforth
Assistant Examiner—E. E. Lehmann
Attorney—Christel & Bean

[57] ABSTRACT

Apparatus for joining the end of a hollow, elongated plastic member to a plastic sheet member and jointly molding the same including a molding member of dielectric material, preferably Teflon, having a rounded cavity in a surface thereof. A first, mandrel-shaped electrode is supported in the molding member and extends into the cavity. A second, outer electrode encircles the molding member and cavity. The plastic members are positioned so that the end to be formed is in the cavity, in contact with the wall thereof, and a high frequency electric current, in the range of about 25–27 megacycles, is passed through the molding member and plastic members whereupon the members are jointly formed into a rounded tip.

3 Claims, 2 Drawing Figures

PATENTED DEC 19 1972    3,706,620

INVENTOR.
EDWARD G. DYKSTRA
BY
Christel + Bean
ATTORNEYS

METHOD AND APPARATUS FOR FORMING THE END OF A PLASTIC TUBE AND SEALING THE TUBE WITHIN A FLEXIBLE CONTAINER

BACKGROUND OF THE INVENTION

This invention relates to the plastic forming art and, more particularly, to a novel method and apparatus for forming the end of a plastic tube and for making a sealed, smoothly-formed connection between a tube and a flexible plastic container.

One area of use of the present invention is in the making of disposable plastic bags for medical procedures and while the present invention will be described in conjunction with the making of such bags the principles of the invention can be variously applied to the forming and making of other plastic items. In recent times, disposable plastic bags have become increasingly desirable for storing liquids to be fed intraveneously to patients as well as for storing body fluids discharged from patients prior to testing or disposal.

In the manufacture of such disposable bags, a problem exists in providing an entrance and a discharge nipple. In particular, such plastic bags comprise a pair of flat plastic sheet members which are heat-sealed around their edges to form a bag. At one portion the bag is formed with an entrance and a discharge opening, and since this plastic sheet material is very thin and flexible, the opening is usually reinforced by means of an inserted piece of plastic tubing of much greater wall thickness. It is customary to provide an encircling heat seal around the assembled outlet and tube, but this procedure undesirably leaves exposed the raw outer edges of the sheet material and the reinforcing tubing.

It would, therefore, be highly desirable to provide apparatus for forming the end of a tubular plastic member into a smooth rounded tip. More particularly, it would be advantageous to provide a method and apparatus for making a sealed tubular connection within a flexible container at an opening therein which connection is smooth and formed in a unitary, rounded tip.

The present invention provides apparatus for forming the end of a relatively rigid tubular plastic member which apparatus includes a molding member of dielectric material, preferably Teflon, having a rounded cavity in a surface thereof. The assembled plastic members, that is the rigid tubular member and the surrounding plastic bag portions, are positioned so that the end to be formed is in the cavity, in contact with the wall thereof, and a high frequency electric current is passed through the molding member and plastic member whereupon the end thereof is formed into a rounded tip. Prior to forming, the tubing can be inserted into the discharge opening of a flexible plastic bag so that one end of the tubing is within the bag and the other end of the tubing is substantially contiguous with the edge of the bag opening. In response to the flow of high frequency electric current, the end of the tubing and the overlying edges of the bag opening are fused together in a unitary, rounded tip.

By way of illustration, the present invention will be described with particular reference to the making of a discharge nipple in a disposable plastic bag although the principles may be variously applied. While a single specific embodiment of the principles of the present invention is illustrated in the accompanying drawing and is described in detail in the following specification, it is to be understood that such embodiment is by way of example only and that various mechanical modifications may be made without departing from the spirit of the invention.

DESCRIPTION OF THE PREFERRED EMBODIMENT

Figure 1:
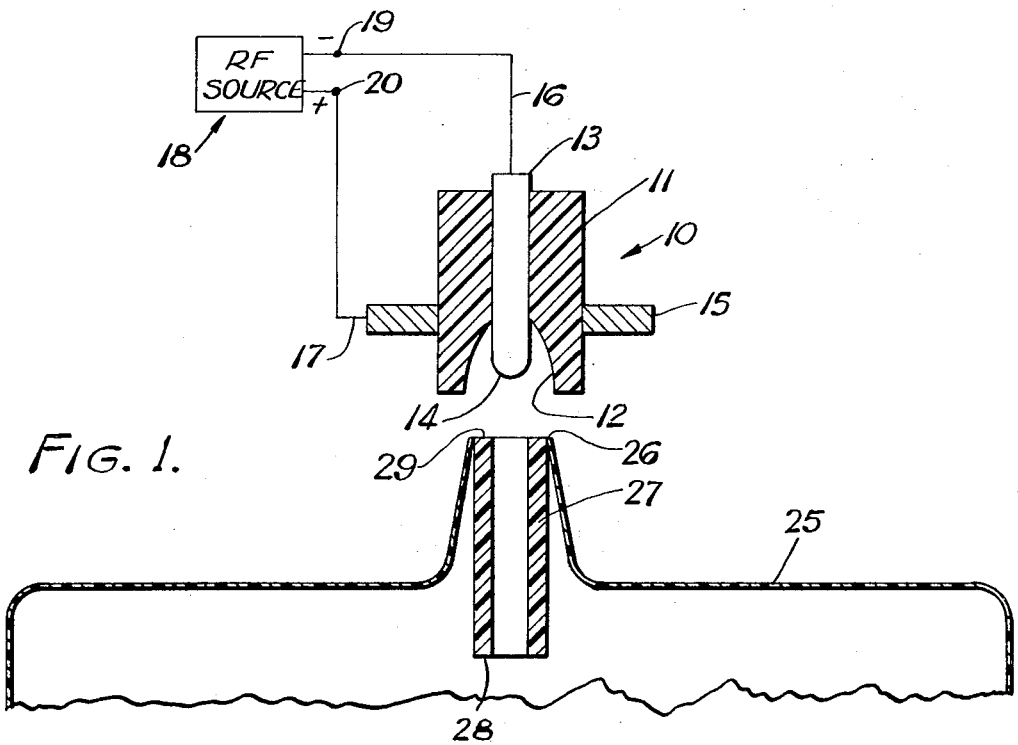
FIG. 1 is a diagrammatic, side elevation view of the apparatus of the present invention illustrating one step in the method thereof for sealing a plastic tube within an outlet portion of a flexible container.
Figure 2:
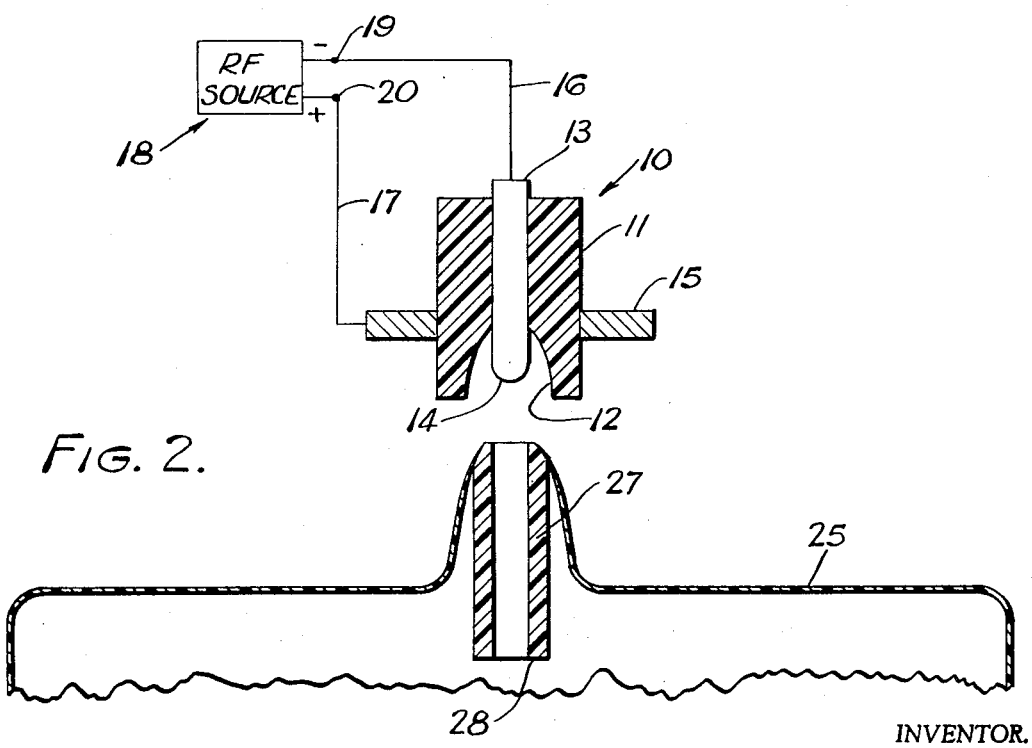
FIG. 2 is a diagrammatic, side elevation view of the apparatus of the present invention identical to FIG. 1 but illustrating the completed sealed connection provided thereby.

The apparatus of the present invention is designated generally at 10 in FIGS. 1 and 2 and comprises a molding member 11 of dielectric material having a rounded cavity 12 in a surface thereof. Molding member 11 preferably is of Teflon and of generally cylindrical shape with cavity 12 provided in one axial end thereof. As a result, the shape of member 11 is similar to that of a thimble.

The apparatus further comprises a mandrel electrode in the form of metal rod 13 supported in molding member 11 and positioned so that one end 14 of electrode 13 extends into cavity 12. In preferred form, cavity 12 is in one axial end of member 11 and centered with respect to the longitudinal axis thereof. Metal rod 13 likewise is disposed so that the longitudinal axis thereof is coincident with the longitudinal axis of cavity 12 and, in this example, also with the axis of member 11. The end 14 of electrode 13 extends into cavity 12 for a major portion of the length thereof, and end 14 has an outer shape and size adapted to fit within the tubular plastic member being formed as will be described hereafter.

The apparatus of the present invention further comprises an outer electrode in the form of an annulus 15 encircling molding member 11 and mandrel electrode 13. Electrode 15 preferably is attached to the outer surface of molding member 11 and is positioned axially thereon substantially in alignment with the innermost portion of cavity 12. The apparatus finally comprises means in the form of electrical conductors 16, 17 for connecting mandrel electrode 13 and outer electrode 15 to opposite polarity terminals of a source, designated generally at 18, of high frequency electrical current. In this particular arrangement, conductor 16 connects mandrel electrode 13 to the negative polarity terminal 19 of source 18 and conductor 17 connects electrode 15 to the positive terminal 20 thereof. Source 18 should be of the type providing a high frequency electrical current, for example in the range of about 25–27 megacycles. Since such sources are readily commercially available and since source 18 by itself comprises no part of the present invention, a detailed description thereof is deemed unnecessary.

In accordance with the present invention, the foregoing apparatus thereof can be used to seal a relatively short member of plastic tubing in the discharge opening of a plastic bag of thin sheet material. Referring now to FIG. 1, a flexible container is shown in the form of plastic bag 25. Bag 25 is of well-known construction and formed by taking two relatively thin sheets of plastic material and heat sealing them together around the edges thereof. Bag 25 is especially useful for storing liquids, such as in medical procedures, and it is necessary to provide a nipple for enabling a leakproof connection or extension to be made, for example, to a length of latex tubing or to a molded part. For this reason, bag 25 is provided with a relatively small, preferably circular opening indicated at 26 in FIG. 1. It is necessary to reinforce this opening 26 for connection to the afore-mentioned latex tubing or molded part. This needed reinforcement is provided by a relatively short member of plastic tubing, indicated at 27 in FIG. 1, which tubing 27 is sealed in bag 25 according to the present invention in the following manner.

Tubing 27 first is inserted into bag opening 26 so that one end, designated 28, of tubing 27 is within bag 25 and the other end of tubing 27, designated 29, is substantially contiguous with the edge of bag opening 26. In other words, the distance between the end of tubing 27 and the edge of bag opening 26 is within ordinary manufacturing tolerances. Tube 27 should have an outer diameter such that it fits reasonably snugly in opening 26. Next, the assembly of bag 25 and tubing 27 is brought into operative contact with the apparatus designated 10 in FIGS. 1 and 2 for sealing. In particular, end 14 of mandrel-shaped electrode 13 is inserted in tubing 27. At the same time, the end 29 of tubing 27 and the portion of bag 25 covering this end of the tubing are placed in contact with the wall of concave cavity 12. It is apparent, therefore, that the size and shape of end 14 of electrode 13 must be such as to fit within tubing 27, and cavity 12 should be of a dimension such that tubing 27 can be received therein with tubing end 29 in contact with the wall of cavity 12. Then, a high frequency electric current from source 18 is passed through member 11 between electrode 13 and outer electrode 15. The assembled bag and tubing are urged into the cavity 12 and the heating provided by this flow of high frequency current causes end 29 of tubing 27 and the edge of the bag 25 defined by opening 26 to be fused and simultaneously shaped together in a unitary, rounded tip. This resulting sealed connection is shown in FIG. 2.

The magnitude of current which must be supplied by source 18 will vary with the size and type of materials used and desired speed of operation and can be determined readily by means of calculations well-known to those familiar with the art. While the material of bag 25 and tubing 27 can vary to some extent, both the bag and tubing may be of polyvinyl chloride plastic.

The method and apparatus of the present invention advantageously allows the making of a sealed connection of a relatively short member of plastic tubing in a plastic bag of thin sheet material at an opening in the bag. Significantly, the end of the tubing and the edge of the bag opening are fused together in a unitary, rounded tip. This connection is superior to those made heretofore, the latter being characterized by exposed raw outer edges of the bag sheet material and the reinforcing tubing. In addition, the unitary, rounded tip provides a completely liquid-tight connection between bag and tubing. All of these advantageous results are obtained with a method and apparatus convenient and economical to operate and manufacture in which method and apparatus two pieces of plastic, one tubular and the other flat, are sealed together to provide a substantially unitary integral outlet nipple.

I claim:

1. A method of sealing a relatively short member of plastic tubing in a plastic bag of thin sheet material provided with an opening therein, comprising the steps of:
   a. inserting the tubing into the bag opening so that one end of the tubing is within the bag and the other end of the tubing is contiguous with the edge of the bag opening;
   b. placing a mandrel-shaped electrode into the tubing and a dielectric member having a cup-shaped cavity in contact with the portion of the bag covering the end of the tubing;
   c. passing a high frequency electric current through the dielectric member between the mandrel-shaped electrode and an electrode encircling the dielectric member; and
   d. fusing and simultaneously shaping the end of the tubing and edge of the bag opening together in a unitary, rounded tip.

2. A method according to claim 1 wherein the outer ends of the bag and tubing are placed in a cavity in a dielectric material consisting essentially of Teflon.

3. A method according to claim 1 wherein said step of passing electric current is done at a frequency of about 25–27 megacycles.

* * * * *